June 5, 1934.　　　　S. W. E. ANDERSSON　　　　1,961,324
GAS VALVE
Filed Feb. 15, 1932　　　　2 Sheets-Sheet 1
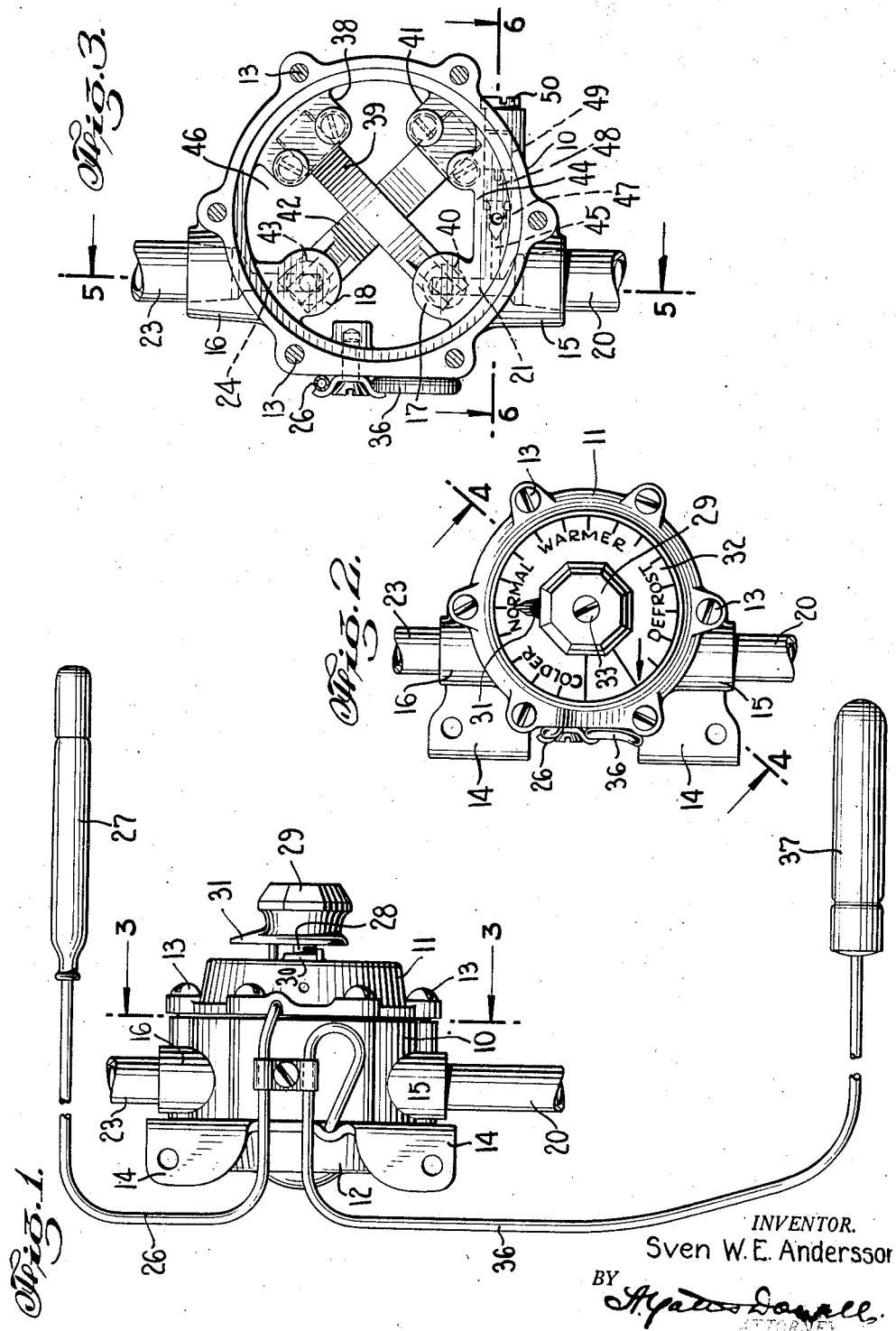
INVENTOR.
Sven W. E. Andersson June 5, 1934.　　　　S. W. E. ANDERSSON　　　　1,961,324
GAS VALVE
Filed Feb. 15, 1932　　　2 Sheets-Sheet 2
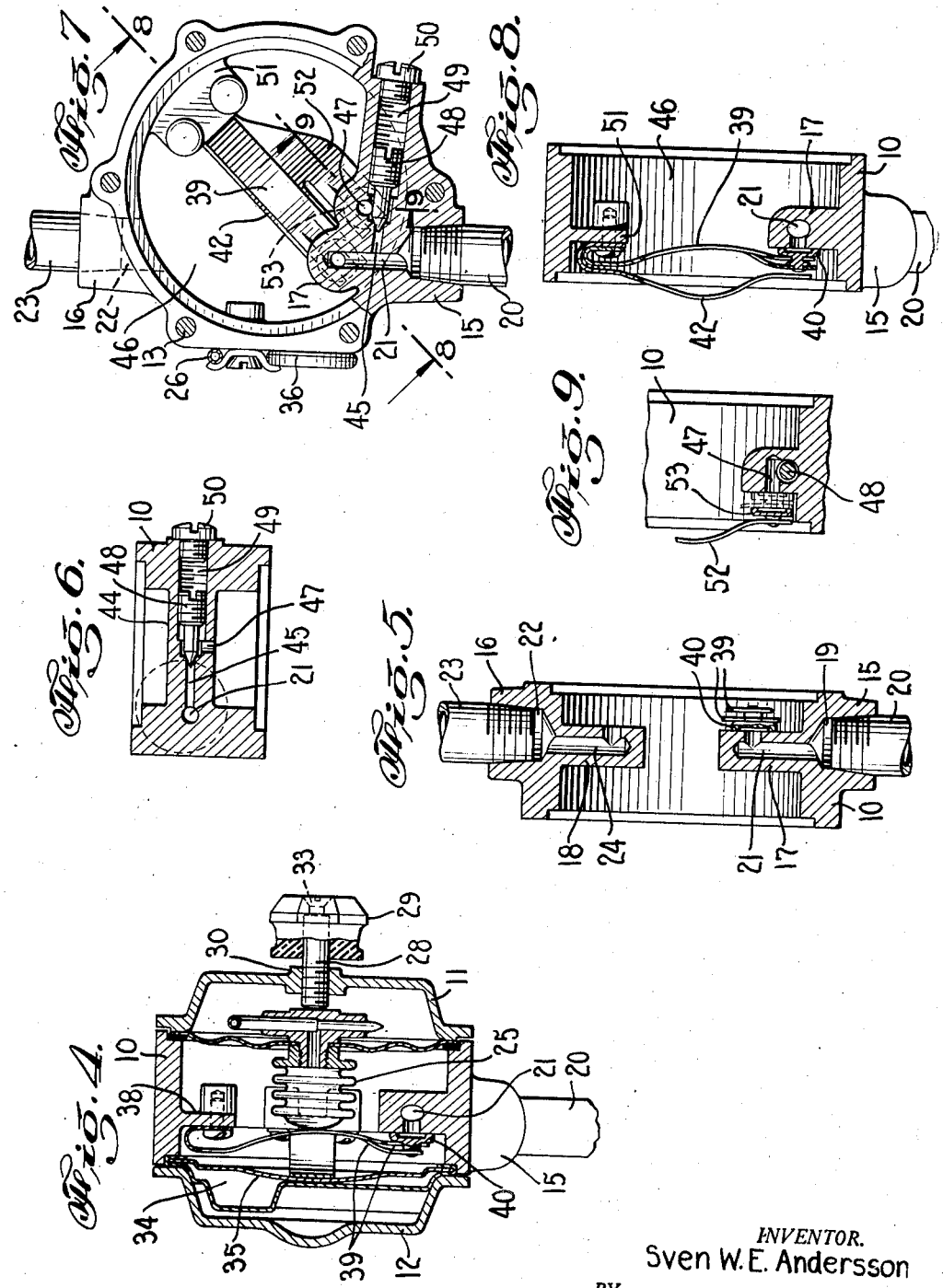
INVENTOR.
Sven W. E. Andersson Patented June 5, 1934

1,961,324

UNITED STATES PATENT OFFICE 1,961,324

GAS VALVE

Sven W. E. Andersson, New York, N. Y., assignor to Electrolux Servel Corporation, New York, N. Y., a corporation of Delaware Application February 15, 1932, Serial No. 592,977

9 Claims. (Cl. 236—92)

This invention relates to automatic valves for the control of gas flow to burners for heat or cold producing machines, and more particularly control valves for absorption type refrigerating apparatus heated by gas flame.

Briefly, in refrigerating apparatus of this type a solution of refrigerant, such as ammonia, in an absorption liquid, such as water, is heated in a generator. The ammonia which is expelled from solution in the form of gas in the generator is cooled in a condenser under generator pressure and thereby condensed to a liquid. The liquid ammonia then vaporizes in an evaporator and the resulting gas is again absorbed in water from which ammonia was expelled in the generator and the cycle is repeated.

When the generator is heated by a gas flame the temperature of the evaporator is controlled by varying the temperature of the generator, that is by regulating the flow of gas to the burner. In this type of apparatus operated at high pressure there is always the danger that the pressure will rise above safe limits whereupon an explosion might occur unless heating is discontinued. It is therefore usual practice to provide a device for cutting off the supply of gas to the burner responsive to a predetermined pressure or temperature rise in the apparatus.

This invention contemplates a simple and compact device for automatically regulating the flow of gas to the burner responsive to the evaporator temperature and cutting off the gas responsive to a predetermined rise of temperature or pressure in the apparatus.

Other objects and advantages will be apparent from the following description taken in connection with the accompanying drawings, in which, Fig. 1 is a side elevation of a control device contemplated by this invention;

Fig. 2, a front view of the device in Fig. 1;

Fig. 3, a section taken on line 3—3 in Fig. 1;

Fig. 4, a section taken on line 4—4 in Fig. 2;

Fig. 5, a section taken on line 5—5 in Fig. 3;

Fig. 6, a section taken on line 6—6 in Fig. 3;

Fig. 7, a view similar to that in Fig. 3 showing a modified arrangement of the parts;

Fig. 8, a section taken on line 8—8 in Fig. 7; and

Fig. 9, a detail section taken on line 9—9 in Fig. 7.

Referring to Fig. 1 of the drawings, the control device casing comprises a body section 10 which may be annular as shown, and covers 11 and 12 which are secured to the body portion as by screws 13. One of the covers 12 is formed with an extending portion 14 adapted to serve as a mounting bracket. The body portion 10 is formed with opposite external bosses 15 and 16 and corresponding internal bosses 17 and 18 as best shown in Figs. 3 and 5. The external boss 15 is drilled to form a passage 19 to receive a gas inlet pipe 20 and the internal boss 17 is drilled to form an inlet passage 21 extending from passage 19 to a surface of the internal boss which is machined around the opening of passage 21 to form a good valve seat. The opposite external boss 16 is correspondingly drilled to form passage 22 to receive the gas outlet pipe 23 which is connected to the burner and the internal boss 18 is drilled to form passage 24 extending from the passage 22 to a surface of the inner boss, which surface is also machined to form a good valve seat.

In the upper part of the valve housing beneath the cover 11, as shown in Figs. 1 and 4, is mounted the expansible element 25 of the temperature control thermostat which includes the expansible element connected through a capillary tube 26 to a sensitive bulb 27. The thermostat contains a fluid which increases and decreases in volume responsive to temperature changes of the evaporator of the refrigerating machine on which the bulb 27 is adapted to be mounted. The position of the expansible element 25 is varied by an adjusting screw 28 provided with a knob 29 and threaded through a boss 30 in the cover 11. As shown in Fig. 2 the knob 29 is provided with a pointer 31 which moves over an appropriately indexed scale on the cover 11. The knob 29 is adjustable with respect to the screw 28 so that by turning the screw the control thermostat can be adjusted for normal operation and the knob then secured by the screw 33 with the pointer 31 indicating normal on the scale 32.

In the lower part of the valve housing under the cover 12 is secured an expansible element 34 having a snap-acting pressure responsive diaphragm 35. The expansible element 34 is connected through a capillary tube 36 to a sensitive bulb 37 forming a thermostat which is filled with a fluid which expands responsive to an increase in temperature of the part of the refrigerating apparatus where the sensitive bulb 37 is located.

As shown in Fig. 3, a boss 38 is formed on the inside of the body portion 10 of the valve housing diagonally opposite the boss 17 in which the inlet opening 21 is drilled. One end of a flexible member such as leaf-spring 39 is secured to the boss 38 and its other end extends over the opening of the inlet passage 21 in the machined surface of boss 17 and carries a valve member 40 which is held by the tension of the spring-leaf 39 against the surface closing the inlet valve passage 21. As best shown in Fig. 4 the spring-leaf 39 is slightly arched upwardly in the middle where it is contacted and forced downwardly by the expansion of the control thermostat element 25 responsive to an increase in temperature of the evaporator, thus raising the valve member 40 to uncover the gas inlet opening 21. The amount by which the opening of the inlet valve passage 21 is uncovered depends upon the movement of the expansible thermostat member 25 and therefore the flow of gas is regulated responsive to the temperature of the evaporator.

Upon the interior of the body portion 10 of the valve housing is formed another boss 41 diagonally opposite the boss 18 in which is drilled the gas outlet passage 24. A flexible lever such as leaf-spring 42 has one end secured to the boss 41 and its other end overlying the opening of the outlet passage 24 in boss 18 and carries a valve member 43 in a position leaving the opening of the passage normally open. The lever 42 is contacted by the snap-acting diaphragm 35 of the cut-out thermostat element 34 and upon upward movement of this diaphragm responsive to a predetermined increase in temperature at the point where the sensitive bulb 37 of the cut-out thermostat is located, the valve member 43 is snapped over the opening of the outlet passage 24 thus cutting off gas to the burner.

In order to maintain a minimum or pilot flame when, during normal operation, the control valve is closed responsive to a decrease in evaporator temperature, it is necessary to provide a small by-pass around the control valve. As shown in Fig. 6, the interior of the body 10 of the housing is provided with a portion 44 in which is drilled a small by-pass conduit 45 communicating at one end with the gas intake passage 21 and opening into chamber 46 at its other end 47. The flow of gas through this by-pass conduit 45 is controlled by a valve member 48 which is screwed into a threaded passage 49 from the exterior of the casing 10. The passage 49 is normally closed by a screw 50 which may be removed for adjusting the by-pass valve member 48.

In Fig. 7 is shown a slightly modified arrangement in which the cold control thermostat and the high temperature cut-off thermostat operate the same valve. In this arrangement gas from conduit 20 flows through inlet passage 21 into chamber 46 within the housing, as in the arrangement previously described, while the outlet conduit 23 to the burner communicates directly with the chamber 46 through passage 22 drilled in the boss 16. A single boss 51 diametrically opposite boss 17 through which the inlet passage 21 opens, carries one end of both the cold control lever 39 and the high temperature cut-off lever 42. The other end of lever 39 extends over the opening of inlet passage 21 and carries valve member 40, as previously described. The other end of the gas cut-off lever 42 extends over the valve member 40 which is carried by the lever 39 and is normally spaced therefrom a distance to allow full operation of this valve. When lever 42 is snapped upwardly by the high temperature cut-off thermostat it forces the valve member 40 against its seat, closing the gas inlet passage 21.

In this arrangement a fork 52 is provided on the cut-off lever 42, the end of this fork carrying a valve member 53 overlying but normally spaced from the opening 47 of the by-pass conduit 45. When the snap-acting thermostat operates responsive to a predetermined high temperature the valve member 53 is carried against its seat closing the by-pass conduit, whereby all flow of gas to the burner is completely cut off.

For purposes of description, conduit 20 has been referred to as the inlet and conduit 23 as the outlet. Obviously the device is not so limited and may be connected either way in the burner supply line.

It will be obvious to those skilled in the art that various other changes may be made in the construction and arrangement of parts without departing from the spirit of the invention and therefore the invention is not limited to what is shown in the drawings and described in the specification but only as indicated in the appended claims.

I claim:

1. A device for controlling the flow of gas to the burner of a gas flame heated refrigerating apparatus of the absorption type comprising a casing enclosing a fluid tight chamber having inlet and outlet openings adapted to be connected to the gas supply and burner respectively, a valve controlling one of said openings, means within said chamber for operating said valve responsive to the evaporator temperature, a normally open valve controlling the other of said openings, and temperature responsive means operative to close said valve upon a predetermined rise in temperature of the generator.

2. A device for controlling the flow of gas to the burner of a gas flame heated refrigerating apparatus comprising a casing enclosing a fluid tight chamber having inlet and outlet openings adapted to be connected to the gas supply and burner respectively, a valve controlling one of said openings, means within said chamber for operating said valve responsive to the temperature at a specified point, a normally open valve controlling the other of said openings, and means operative to close said valve upon a predetermined rise in temperature in a part of said apparatus.

3. A device for controlling the flow of gas to the burner of a gas flame heated apparatus comprising a casing enclosing a fluid tight chamber having inlet and outlet openings adapted to be connected to the gas supply and burner respectively, a valve controlling one of said openings, temperature responsive means within said chamber for operating said valve, a normally open valve controlling the other of said openings, and means operating to close last said valve upon a predetermined rise in temperature in said apparatus.

4. A device for controlling the flow of gas to the burner of a gas flame heated refrigerating apparatus of the absorption type comprising a casing enclosing a fluid tight chamber having inlet and outlet openings adapted to be connected to the gas supply and burner respectively, a valve controlling said inlet opening, means within said chamber for operating said valve responsive to the evaporator temperature, a by-pass around said valve, a valve in said by-pass adjustable from the exterior of said casing, a normally open valve controlling said outlet opening, and means operative to close last said valve upon a predetermined rise in temperature in some part of the apparatus.

5. A control device for the burner of a gas flame heated refrigerating apparatus of the absorption type comprising a casing enclosing a fluid tight chamber having inlet and outlet openings adapted to be connected with the gas supply and burner respectively, a valve controlling one of said openings, means within said chamber for operating said valve responsive to the evaporator temperature, a by-pass around said valve adjustable from the exterior of said casing, and means including an element within said chamber operative to cut off all flow of gas through said chamber responsive to a predetermined rise in temperature in a part of said apparatus.

6. A control device for the burner of a gas flame heated refrigerating apparatus of the absorption type comprising a casing enclosing a fluid tight chamber having inlet and outlet openings adapted to be connected to the gas supply and burner respectively, a valve controlling one of said openings, means for operating said valve responsive to the evaporator temperature, a by-pass around said valve adjustable from the exterior of said casing, a normally open valve controlling said by-pass, and means operative to close both said valves upon a predetermined rise in temperature in a part of the apparatus.

7. A control device for the burner of a gas flame heated refrigerating apparatus of the absorption type comprising a casing enclosing a fluid tight chamber having inlet and outlet openings adapted to be connected to the gas supply and burner respectively, a valve controlling said inlet opening, a flexible lever within said chamber adapted to urge said valve to its closed position, an expansible fluid thermostat having its expansible element within said chamber adapted to oppose the action of said lever to open said valve responsive to an increase in temperature of the evaporator where its sensitive bulb is located, a valve controlling said outlet opening, a second flexible lever secured within said chamber and normally urging the last said valve to its open position, a fluid pressure thermostat having a snap-acting expansible element within said casing adapted to close the last said valve against the action of said lever responsive to a predetermined rise in temperature of a part of said refrigerating apparatus where the sensitive bulb is located.

8. A control device for the burner of a flame heated refrigerating apparatus of the absorption type comprising a casing enclosing a fluid tight chamber having inlet and outlet openings adapted to be connected to the gas supply and burner respectively, a valve controlling said inlet opening, resilient means tending to urge said valve to its closed position, an expansible fluid thermostat having its expansible element within said chamber adapted to open said valve against the action of said resilient means responsive to an increase in temperature of the evaporator where its sensitive bulb is located, a by-pass around said valve adjustable from the exterior of said casing, a valve controlling said outlet opening, resilient means adapted to normally maintain said valve in its open position, and an expansible fluid thermostat having a snap-acting expansible element in said casing adapted to close the last said valve against the action of said resilient means responsive to a predetermined rise in temperature in the part where its sensitive bulb is located.

9. A control device for the burner of a flame heated refrigerating apparatus of the absorption type comprising a casing enclosing a fluid tight chamber having inlet and outlet openings adapted to be connected to the gas supply and burner respectively, a valve controlling said inlet opening, resilient means tending to urge said valve to its closed position, an expansible fluid thermostat having its expansible element within said chamber and adapted to open said valve against the action of said resilient means responsive to an increase in temperature of the evaporator where its sensitive bulb is located, a by-pass around said valve adjustable from the exterior of said casing, a normally open valve controlling said by-pass, resilient means adapted to maintain last said valve in its open position, and an expansible fluid thermostat having a snap-acting expansible element within said casing adapted to close the last said valve against the action of said resilient means and close said inlet opening valve against the action of first said thermostat responsive to a predetermined rise in temperature in the part where its sensitive bulb is located.

SVEN W. E. ANDERSSON.